(12) United States Patent
Mizrahi

(10) Patent No.: US 9,942,175 B1
(45) Date of Patent: Apr. 10, 2018

(54) EFFICIENT STORAGE OF SEQUENTIALLY TRANSMITTED PACKETS IN A NETWORK DEVICE

(71) Applicant: Marvell Israel (M.I.S.L) Ltd., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 183 days.

(21) Appl. No.: 14/671,678

(22) Filed: Mar. 27, 2015

Related U.S. Application Data

(60) Provisional application No. 61/971,513, filed on Mar. 27, 2014.

(51) Int. Cl.
*H04L 12/861* (2013.01)
*H04L 12/801* (2013.01)

(52) U.S. Cl.
CPC .......... *H04L 49/9057* (2013.01); *H04L 47/34* (2013.01); *H04L 49/9063* (2013.01)

(58) Field of Classification Search
CPC .. H04L 49/9057; H04L 47/34; H04L 49/9063
See application file for complete search history.

(56) References Cited

U.S. PATENT DOCUMENTS

| | | | | |
|---|---|---|---|---|
| 6,327,625 B1 * | 12/2001 | Wang | ................. | H04L 12/5693 709/220 |
| 6,377,587 B1 * | 4/2002 | Grivna | ................. | H04L 1/1664 370/474 |
| 8,830,841 B1 | 9/2014 | Mizrahi et al. | | |
| 2004/0062267 A1 * | 4/2004 | Minami | .............. | H04L 12/5693 370/463 |
| 2005/0286526 A1 * | 12/2005 | Sood | ....................... | H04L 47/10 370/394 |
| 2010/0005199 A1 * | 1/2010 | Gadgil | .................... | G06F 13/28 710/22 |

OTHER PUBLICATIONS

ITU-T Y.1564 Series Y: Global Information Infrastructure, Internet Protocol Aspects and Next-Generation Networks Internet protocol aspects—Quality of service and network performance,"Ethernet service activation test methodology," *International Telecommunication Union*, pp. 1-38 (Mar. 2011).

(Continued)

*Primary Examiner* — Derrick Ferris
*Assistant Examiner* — Kevin Lee

(57) ABSTRACT

A sequence of packets is stored in a memory of the network device such that a current packet in the sequence of packets is stored at a predetermined distance following a preceding packet in the sequence. Lengths of corresponding ones of the packets stored in the memory are indicated in the memory. The packets are sequentially read from the memory based on the indicated lengths of corresponding ones of the packets stored in the memory. An operation is performed on the ones of the packets read from the memory. Subsequent to performing the operation, least some of the packets are written back to the memory. Ones of the packets are written to the memory beginning at a memory location following a respective preceding packet in the sequence by a predetermined distance.

12 Claims, 5 Drawing Sheets

(56) References Cited

OTHER PUBLICATIONS

ITU-T Y.1731 Series Y: Global Information Infrastructure, Internet Protocol Aspects and Next-Generation Networks Internet protocol aspects—Operation, administration and maintenance, *International Telecommunication Union*, pp. 1-82 (Feb. 2008).
Hedayat et al., "A Two-Way Active Measurement Protocol (TWAMP)," Network Working Group IETF RFC 5357 pp. 1-26 (Oct. 2008).
Bradner et al., "Benchmarking Methodology for Network Interconnect Devices," Network Working Group IETF RFC 2544 pp. 1-29 (Mar. 1999).
Morton et al., "Packet Reodering Metrics," Network Working Group IETF RFC 4737 pp. 1-45 (Nov. 2006).

* cited by examiner

EFFICIENT STORAGE OF SEQUENTIALLY TRANSMITTED PACKETS IN A NETWORK DEVICE

CROSS-REFERENCE TO RELATED APPLICATION

This disclosure claims the benefit of U.S. Provisional Patent Application No. 61/971,513, filed Mar. 27, 2014, entitled "Efficient Storage of Periodically Transmitted Packets," the disclosure of which is hereby expressly incorporated herein by reference in its entirety.

FIELD OF THE DISCLOSURE

The present disclosure relates generally to communication networks and, more particularly, to network devices such as switches, routers, and edge devices.

BACKGROUND

To monitor connectivity, detect link failures, and monitor various performance parameters of computer networks, network devices such as network switches, routers, edge devices and the like periodically transmit a sequence of packets and perform detection and/or measurements using the sequence of packets. A sequence of packets is typically stored in a memory using buffers. For example, each packet is stored in a separate buffer, and the sequence of packets is maintained as a linear list, or a linked list, of the separate buffers. Storing the packets in separate buffers allows the network device to easily modify a sequence, for example by removing a particular packet from the sequence or adding a packet to the sequence. However, storage of packets in separate buffers typically results in inefficient usage of the memory due to unused memory space in the separate buffers.

SUMMARY

In an embodiment, a method for storing a sequence of packets to be transmitted by a network device includes storing the sequence of packets in a memory of the network device, wherein the memory includes a plurality of memory locations, and wherein storing the sequence of packets includes storing the packets, in the sequence of packets, such that a current packet in the sequence of packets is stored at a predetermined distance following a preceding packet in the sequence. The method additionally includes indicating, in the memory of the network device, lengths of corresponding ones of the packets stored in the memory. The method further includes based on the indicated lengths of corresponding ones of the packets stored in the memory, sequentially reading the packets from the memory. The method further still includes performing an operation on the ones of the packets read from the memory. The method further yet includes subsequent to performing the operation, writing at least some of the packets back to the memory, ones of the packets being written to the memory beginning at a memory location, of the plurality of memory locations, following a respective preceding packet in the sequence by a predetermined distance.

In another embodiment a system comprises an egress interface configured to transmit a sequence of packets. The system further comprises a memory that includes a plurality of memory locations. The memory is configured to store the sequence of such that a current packet in the sequence of packets is stored in the memory at a predetermined distance following a preceding packet in the sequence. The system additionally comprises a processor configured to indicate, in the memory, lengths of corresponding ones of the packets stored in the memory. The processor is additionally configured to, based on the indicated lengths of corresponding ones of the packets stored in the memory, sequentially r the packets from the memory, and perform an operation on the ones of the packets read from the memory. The processor is further configured to subsequent to performing the operation, write at least some of the packets back to the memory, ones of the packets being written to the memory beginning at a memory location, of the plurality of memory locations, following a respective preceding packet in the sequence by a predetermined distance.

DETAILED DESCRIPTION

Figure 1:
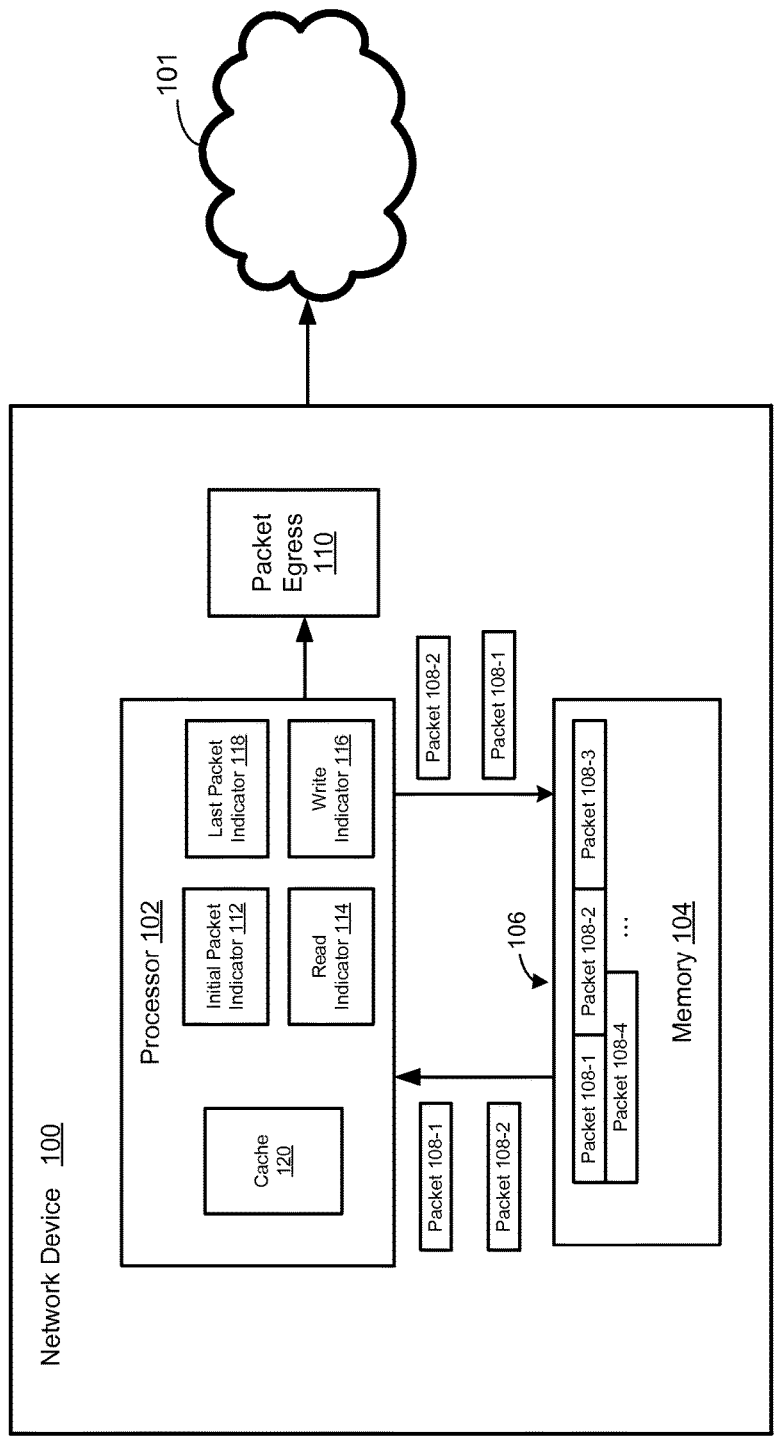
FIG. 1 is a block diagram of an example network device configured to efficiently store a sequence of packets to be periodically transmitted by the network device, according to an embodiment.

FIG. 1 is a block diagram of an example network device 100 configured to efficiently store a sequence of packets to be periodically transmitted by the network device, according to an embodiment. In an embodiment, the network device 100 is a switch. In other embodiments, the network device 100 is suitable network device other than a switch. For example, the network device 100 is a bridge, a router, a network test equipment devices, etc., in some embodiments. The network device 100 includes a processor 102 coupled to a memory 104. The network device 100 also includes an egress interface 110 coupled to the processor 102 and to a network 101. The egress interface 110 is configured to transmit packets provided to the interface 110 by the processor 102 to the network 101, in an embodiment. In an embodiment, the memory 104 is configured to store a sequence of packets to be sequentially transmitted by the network device 100. For example, the sequence 106 of packets 108 is transmitted by the network device 100 as part of a system management procedure conducted by the network device 100. As an example, in an embodiment, the packets 108 are operations and management (OAM) packets used to measure throughput of a link in the network 101, to ensure connectivity in a link in the network 101, etc. in various embodiments. The network device 100 is configured to periodically transmit the sequence 106 of packets 108 to perform periodic measurements or other periodic system management functions, in some embodiments.

In an embodiment, the processor 102 is configured to write the sequence 106 to the memory 104 such each packet 108 of the sequence 106 is stored in the memory 104 at a predetermined distance with respect to the preceding packet 108 in the sequence 106. Further, in an embodiment, the processor 102 is configured to indicate a respective length of each packet 108 of the sequence 106, for example by storing respective length indicators that indicate the lengths of corresponding packets 108 in the memory 104. For example, respective length indicators corresponding to ones of packets 108 are stored in the memory 104 at a memory location immediately preceding the corresponding packet 108, in an embodiment. As used herein, the term "packet" as it relates to a packet stored in the memory 104 sometimes refers to the packet stored in the memory 104 along with the length indicator stored immediately preceding the packet in the memory 104, in some embodiments. In another embodiment, however, length indicators corresponding to the packets 108 are stored in other suitable memory locations in the memory 104, or are stored in a suitable memory other than the memory 104.

In an embodiment, the predetermined distance at which each packet 108 is stored from the preceding packet 108 in the sequence 106 is zero. Accordingly, in this embodiment, the packets 108 are stored "back to back" in the memory 104, without any blank or "white" space between the packets 108 in the memory 104. In another embodiment, however, one or more of the packets 108 (e.g., some of the packets 108 or all of the packets 108) are stored in the memory 104 at one or more predetermined distances other than a zero distance from the preceding packet 108.

In an embodiment, the processor 102 is configured to read the packets 108 from the memory 104, and to perform one or more operations with respect to each of at least some of the packets 108 read from the memory 104. For example, the processor 102 is configured to, after reading a packet 108 from the memory 104, perform one or more of (i) sending the packet 108 to the egress interface 110 for transmission of the packet via the egress interface 110, (ii) altering a size of the packet 108, such as shortening the packet 108 or lengthening the packet 108, (iii) removing, or eliminating, the packet 108 from the sequence 106, (iv) replacing the packer 108 with another packet, etc. In an embodiment, as the processor 102 sequentially reads the packets 108 from the memory 104, and performs operations with respect to the packets 108 read from the memory 104, the processor 102 writes at least some of the packets 108 back to the memory 104. For example, the processor 102 writes each of the packets 108 read from the memory 104 back to the memory 104 unless the processor 102 removes, or eliminates, the packet 108 from the sequence 106, in which case the processor 102 does not write the packet 108 back to the memory 104, in an embodiment.

In an embodiment, after reading a packet 108 from the memory 104 and performing an operation with respect to the packet 108 (e.g., sending the packet 108 to the egress interface 110) read from the memory 104, the processor 102 writes the packet 108 back to the memory 104 at a predetermined distance from the preceding packet 108 written to the memory 104. As a result, the processor 102 maintains the predetermined distance (or respective predetermined distances) between the packets 108 in the sequence 106 stored in the memory 104 even after eliminating a packet 108 from the sequence 106, or altering a size of a packet 108 in the sequence 106. For example, if a particular packet 108 is removed from the sequence 106, then the following packet 108 in the sequence 106 is written back to the memory 104 at a predetermined distance from the packet 108 that precedes the particular packet 108 removed from the sequence 106, in an embodiment. Similarly, if a size of a particular packet 108 is reduced, and the shortened packet 108 is written back to the memory 104, then the following packet 108 in the sequence 106 is written back to the memory 104 at a predetermined distance from the shorted packet 108 now stored in the memory 104, in an embodiment. Consequently, writing packets 108 back to the memory 104 after reading the packets 108 from the memory 104 allows the processor 102 to perform operations on packets 108 read from the memory 104, such as removing a packet 108 from the sequence 106 or altering a size of a packet 108 in the sequence 106, while still maintaining the predetermined distance between the packets 108 stored in the memory 104, in an embodiment.

In an embodiment, the processor 102 is configured to maintain a read indicator 114 indicative of a memory location from which a next packet 108 in the sequence 106 should be read from the memory 104 and a write indicator 116 indicative of a memory location to which a next packet 108 in the sequence 106 should be written in the memory 104. The processor 102 is configured to utilize the read indicator 114 to sequentially read the packets 108 from the memory 104, and to utilize the write indicator 116 to sequentially write the packets 108 to the memory 104. With continued reference to FIG. 1, in the illustrated embodiment, the processor 102 additionally maintains an initial packet indicator 112 and a last packet indicator 118. The initial packet indicator 112 is set to indicate a memory location at which the initial packet 108 of the packet sequence 106 is stored in the memory 104, in an embodiment. Similarly, the last packet indicator 118 is set to indicate a memory location at which the last packet 108 of the packet sequence 106 is stored in the memory 104, in an embodiment. The processor 102 is configured to begin sequentially reading the packets 108 from the memory 104 as indicated by the initial packet indicator 112. Further, the processor 102 is configured to continue sequentially reading the packets 108 from the memory 104 until reading the last packet 108 in the sequence 106 as indicated by the last packet indicator 118, in an embodiment.

As the processor 102 sequentially reads the packets 108 in the sequence 106, the processor 102 increments the read indicator 114 to indicate a memory location, in the memory 104, at which the processor 102 is to begin reading the next packet 108 in the sequence 106. Thus, for example, in an embodiment in which the packets 108 are stored back to back in the memory 104, each time the processor 102 reads a packet 108 from the memory 104, the processor 102 increments the read indicator 114 by a length of the packet 108 read from the memory 104. In an embodiment in which a packet 108 is stored in the memory 104 at a predetermined distance other than zero from the preceding packet 108 in the memory 104, when the processor 102 reads the preceding packet 108 from the memory 104, the processor 102 increments the read indicator 114 by a sum of the length of the preceding packet 108 read from the memory 104 and the predetermined distance with respect to the preceding packet 108 read from the memory 104 at which the following packet 108 is stored in the memory 104, in an embodiment.

Similarly, as the processor 102 writes the sequence 106 back to the memory 104, the processor 102 increments the write indicator 116 to indicate a memory location, in the memory 104, at which the processor 102 is to begin writing the next packet 108 to be written to the memory 104, in an embodiment. In an embodiment in which the packets 108 are stored back to back in the memory 104, for example, each time the processor 102 reads a packet 108 from the memory 104, the processor 102 increments the write indicator 116 by a length of the packet 108 written to the memory 104. In an embodiment in which a packet 108 is stored in the memory 104 at a predetermined distance other than zero from the preceding packet 108 in the memory 104, when the processor 102 reads the preceding packet 108 from the memory 104, the processor 102 increments the write indicator 116 by a mathematical combination (e.g., a sum) of the length of the preceding packet 108 written to the memory 104 and the predetermined distance with respect to the preceding packet 108 written from the memory 104 at which the following packet 108 is to be stored in the memory 104, in an embodiment.

As discussed above, in some embodiments and/or scenarios, after reading a packet 108 from the memory 104 and prior to writing the packet 108 back to the memory 104, the processor 102 performs an operation on the packet 108 that results in a decrease of a size of the packet 108. For example, the processor 102 modifies a packet 108 to reduce the size of the packet 108, such as by removing, or deleting, a portion of the packet 108, in an embodiment. As another example, in another embodiment or scenario, the processor 102 replaces a packet 108 read from the memory 104 with another packet that is shorter than the packet 108 read from the memory 104. In this case, the processor 102 writes the new, shorter, packet 108 to the memory 104 beginning at the memory location currently indicated by the write indicator 116, in an embodiment. More specifically, in an embodiment, the processor 102 writes an indicator of the new length of the packet 108 at the memory location currently indicated by the write indicator 116, and writes the new packet 108 beginning at a memory location immediately following the length indicator. The processor 102 then increments the write indicator 116 by the length of the new, shorter, packet 108, in an embodiment. Accordingly, in this embodiment, after reading the following packet 108, beginning at the memory location currently indicated by the read indicator 114, the processor 102 writes the following packet 108 read from the memory 104 at the memory location that immediately follows the new shorter packet 108, as indicated by the write indicator 116. In another embodiment, in which the next packet 108 is to be stored in the memory 104 at a predetermined distance other than zero from the new, shorter, packet 108 in the memory 104, the processor 102 increments the write indicator 116 by a sum of the length of the new, shorter, packet 108 and the predetermined at which the following packet 108 is to be stored in the memory 104 with respect to the new, shorter, packet 108. Accordingly, the following packet 108 in the sequence 106 is written back to the memory 104 at the predetermined distance from the new, shorter, packet 108, in this embodiment.

In some embodiments and/or scenarios, after reading a packet 108 from the memory 104 and prior to writing the packet 108 back to the memory 104, the processor 102 performs an operation on the packet 108 that results in an increase of a size of the packet 108. For example, the processor 102 lengthens the packet 108 by inserting one or more fields into the packet 108, by lengthening a payload of the packet 108, etc. As another example, in another embodiment or scenario, the processor 102 replaces the packet 108 read from the memory 104 with another packet that is longer than the packet 108 read from the memory 104. In such situations, simply writing the new, longer, packet 108 back to the memory 104 beginning at the memory location currently indicated by the write indicator 116 will result in a portion of the new packet 108 writing over at least a portion of the following packet 108 in the memory 104, in at least some scenarios. In an embodiment, instead of simply writing the new, longer, packet 108 back to the memory 104, the processor 102 stores at least a portion of the new, longer, packet 108 in a cache 120. For example, the processor 102 writes a portion of the new, longer, packet 108 to back to the memory 104, wherein the portion written back to the memory 104 corresponds in length to the length of the packet 108 originally retrieved from the memory 104, and stores the remaining portion of the new packet 108 in the cache 120, in an embodiment. Subsequently, when the processor 102 retrieves the following packet 108 from the memory 104, the processor 102 writes the at least the portion of the new, longer, packet 108 to the memory 104 beginning at the memory location immediately following the portion, of the new packet 108, already stored in the memory 104, in an embodiment. The processor 102 then increments the write indicator 116 by the length of the new, longer, packet 108, or, alternatively, by a sum of the length of the new packet 108 and a predetermined distance at which the following packet 108 is to be stored in the memory 104 with respect to the new, longer, packet 108, in various embodiments. Accordingly, the processor 102 writes the following packet 108 read from the memory 104 back to the memory 104 at a memory location immediately following the new, longer, packet 108, or at a predetermined distance from the new, longer, packet 108, in various embodiments.

With continued reference to FIG. 1, in some embodiments, the processor 102 is configured to insert one or more additional packets into the sequence 106 stored in the memory 102. In an embodiment, the processor 102 is configured to insert an additional packet 108 by writing the additional packet 108 to the memory 104, preceded by a length indicator indicative of length of the additional packet 108, at a memory location immediately following, of at a predetermined distance from, the last packet 108 in the sequence 106 currently stored in the memory 102. The processor 102 is further configured to update the last packet indicator 118 to indicate a memory location corresponding to the additional packet 108 inserted into the sequence 106, in an embodiment.

Figure 2:
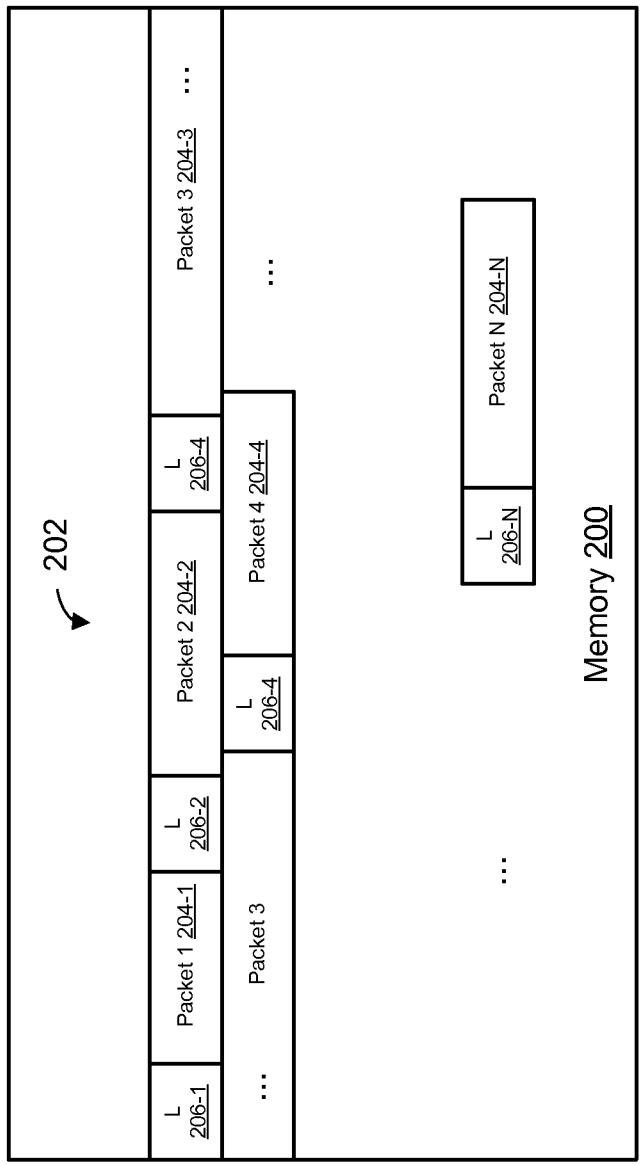
FIG. 2 is a block diagram of an example memory that is used with the network device of FIG. 1, according to an embodiment.

FIG. 2 is a block diagram of an example memory 200 that is used with the network device 100 of FIG. 1, according to an embodiment. For example, the memory 200 corresponds to the memory 104 of the network device 100, according to an embodiment. In other embodiments, however, the memory 104 of FIG. 1 is a suitable memory different than the memory 200 of FIG. 2. Similarly, the memory 200 of FIG. 2 is utilized with a suitable network device other than the network device 100 of FIG. 1, in some embodiments. Merely for explanatory purposes, the memory 200 of FIG. 2 will be described with reference to FIG. 1.

In the embodiment of FIG. 2, a plurality of packets 204 that comprise a packet sequence 202 are stored in the memory 200. Each packet 204 is preceded by a length indicator 206 that indicates a length of the packet 204, in the illustrated embodiment. In an embodiment, the packets 204 and the length indicators 206 are stored in the memory 200 contiguously or "back to back" without any blank or "white" space between the packets 204 and the length indicators 206. In other embodiments, at least some of the packets 204 and/or length indicators 206 are stored in the memory 200 at predetermined distances relative to previous packet 204 and/or indication 206. For example, at least some of the length indicators 206 and corresponding packets 204 are separated from previous length indicators 206 and corresponding previous packets 204 by a predetermined non-zero distance, in some embodiments. Additionally, in some embodiment, at least some of the packets 204 are not preceded by corresponding length indicators 206. For example, length indicators corresponding to some or all of the packets 204 are stored elsewhere in the memory 200 or are stored in a memory other than the memory 200, in some embodiments.

Figure 3:
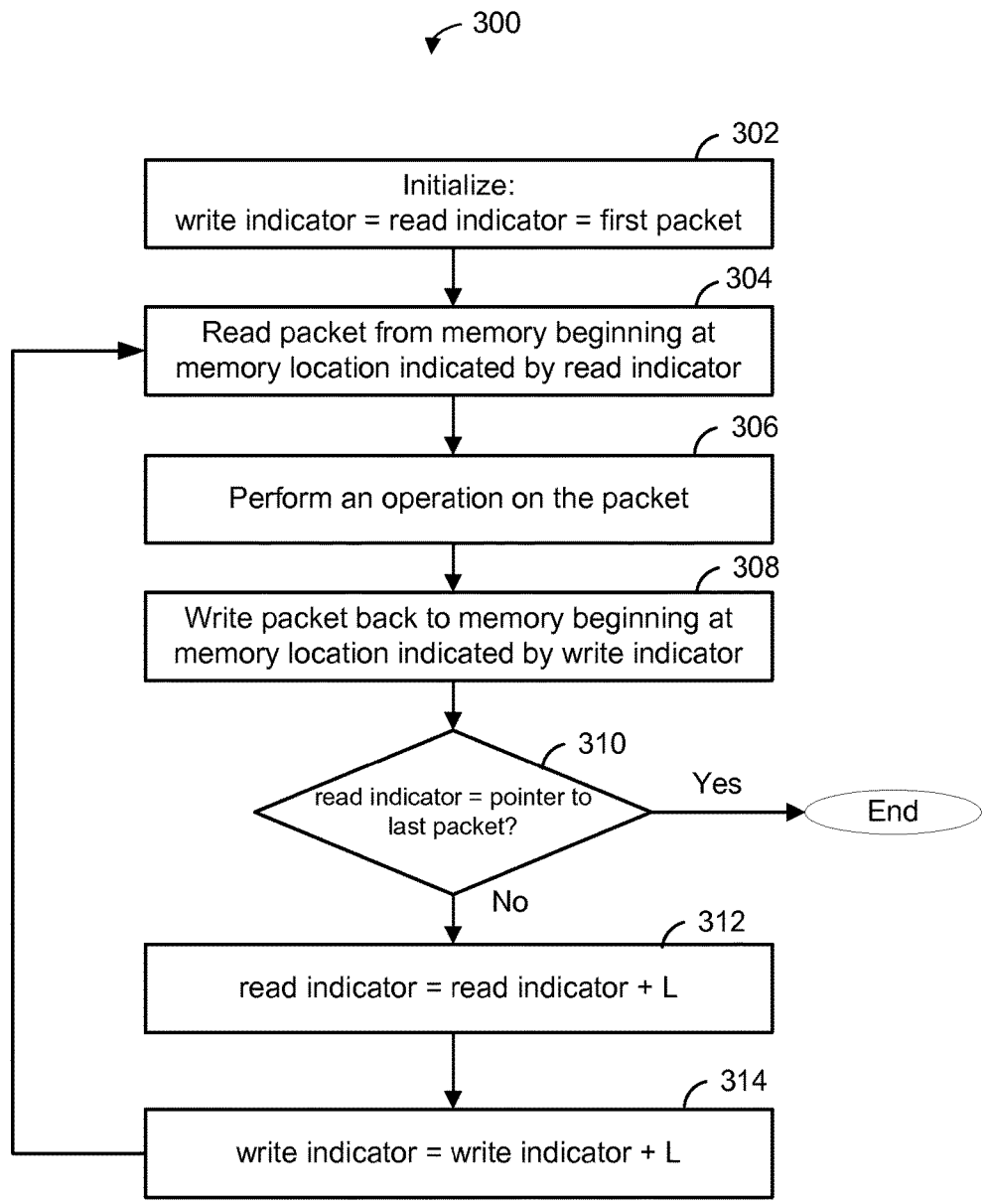
FIG. 3 is a flow diagram of an example method for reading a sequence of packets from a memory and writing a sequence of packets back to the memory, according to an embodiment.

FIG. 3 is a flow diagram of an example method 300 for reading a sequence of packets from a memory and writing a sequence of packets back to the memory, according to an embodiment. In an embodiment, the processor 102 of FIG. 1 implements the method 300 to read a sequence of packets from a memory such as the memory 200 and to write a sequence of packets back to the memory such as the memory 200. In other embodiments, the processor 102 implements a method different from method 300 to read a sequence of packets from a memory and to write a sequence of packets back to the memory. Similarly, the method 300 is implemented by a device other than the processor 102 and/or by a network device other than the network device 100, in some embodiments. Merely for explanatory purposes, the method 300 will be described with reference to FIGS. 1 and 2.

The method 300 begins at block 302 at which the read indicator 114 and the write indicator 116 are initiated to point to a location of an initial packet 204 in the packet sequence 202. In an embodiment, the read indicator 114 and the write indicator 116 are initiated to indicate a memory location of the length indicator 206 corresponding to the first packet 204 in the sequence 202.

At block 304, the processor 102 reads the packet 204 pointed to by the read indicator 114. In an embodiment, in order to properly retrieve the packet 204 pointed to by the read indicator 114, the processor 102 reads the length indicator stored at the memory location pointed to by the read indicator 114, and then reads the packet 204 that follows the length indicator 202 in the memory 200. In an embodiment, the processor 102 reads the packet 204 until reaching the end of the packet 204 according to the length indicated for the packet 204. Thus, for example, the processor 102 reads the first length indicator 206-1 from the memory 200, and then reads the first packet 204-1 from the memory 200 until reaching the end of the first packet 204-1 according to the length indicated for the first packet 204-1 by the length indicator 206-1, in an embodiment.

At block 306, the processor 102 performs an operation on the packet 204 read from the memory 200 at block 304. For example, the processor 102 sends the packet 204 read from the memory 200 to the egress interface 110 for transmission of the packet via the egress interface 110, in an embodiment. Additionally or alternatively, the processor 102 modifies that packet 204 read from the memory 200 at block 304, in some embodiments and/or scenarios. For example, the processor 102 shortens the length of the packet 204, such as by deleting a portion of the packet 204, in an embodiment. As another example, the processor 102 lengthens the packet 204, in an embodiment. As yet another example, the processor 102 replaces the packet 204 read from the memory 200 at block 304 with another packet that is shorter or longer than the packet 204 read from the memory at block 304 or is of equal length with the packet 204 read from the memory at block 304.

At block 308, the processor 102 writes the modified or unmodified packet 204 to the memory 200, and, if necessary, indicates a new length of the packet 204 written to the memory 200. In an embodiment, the processor 102 writes the packet 204, preceded by an indication of the length of the packet 204, beginning at the memory location pointed to by the write indicator 116. Thus, for example, for the initial packet 204-1 read from the memory 200, the processor 102 writes the packet 204-1 to the memory 200, preceded by the length indicator of the altered or unaltered length of the packet 204-1 in the memory 200, beginning at the memory location at which the length indicator 206-1 corresponding to the first packet 204-1 was originally stored in the memory 200. Accordingly, in an embodiment, the processor 102 writes the packet 204-1 back to the memory 200 by "writing over" the packet 204-1 originally stored in the memory 200. In an embodiment, when a modified packet 204 written to the memory 200 at block 308 exceeds the length of the packet 204 read from the memory 200 at block 304, the processor 102 utilizes a cache, such as the cache 120, to store at least a portion of the modified packet 204 to be written to the memory 200 so as to not overwrite the following packet 204 stored in the memory 200. Then, after reading the following packet 204 from the memory 200, the processor 102 transfers the at least the portion of the packet 204 stored in the cache 120 to the memory 200 such that the entire modified packet 204 is contiguously stored in the memory 200, preceded by the length indicator indicative of the new length of the packet 204, beginning at the memory location indicated by the write indicator 116, in an embodiment.

At block 310, it is determined whether the read indicator 114 points to the last packet 204 in the sequence 202 to be read from the memory 200. If it is determined that the read indicator 114 points to the last packet 204 in the sequence 202 to be read from the memory 200, this indicates that the packet read from the memory 200 at block 306 was the last packet in the packet sequence 202. In this case, the method 300 terminates, in an embodiment. In an embodiment, terminating the method 300 includes returning to block 302 and again initiating the method 300.

On the other hand, if it is determine at block 310 that the read indicator 114 does not point to the last packet 204 in the sequence 202 to be read from the memory 200, then the method 300 continues at block 312 at which the read indicator 114 is incremented by the length indicated for the packet read from the memory 200 at block 304. Accordingly, the read indicator 114 is set at block 312 to point to a memory location, in the memory 200, from which to begin reading the next packet 204 in the sequence 202 stored in the memory 200, in an embodiment.

At block 316, the write indicator 116 is incremented by the length of the packet written to the memory 200 at block 308. In another embodiment, the write indicator 116 is incremented by a suitable number greater than the length of the packet written to the memory 200 at block 308. For example, the write indicator 116 is incremented at block 308 such that the following packet 204 in the packet sequence 202 is written at a suitable predetermined distance other than a zero distance from the packet written to the memory 200 at block 308, in an embodiment.

The method 300 then returns to block 304 at which the packet pointed to by the read indicator 114 incremented at block 312 is read from the memory 300. Then, subsequent to performing an operation on the packet at block 306, the packet 204 is written to the memory 200, along with an indicator of a length of the packet 204 being written to the memory 200, beginning at the memory location indicated by the write indicator 116 incremented at block 314. Accordingly, the packet 204 read from the memory 200 at block 304 is written back to the memory 200 at a predetermined distance (e.g., zero or other suitable predetermined distance) relative to the previous packet 204 in the packet sequence 202, in an embodiment.

Figure 4:
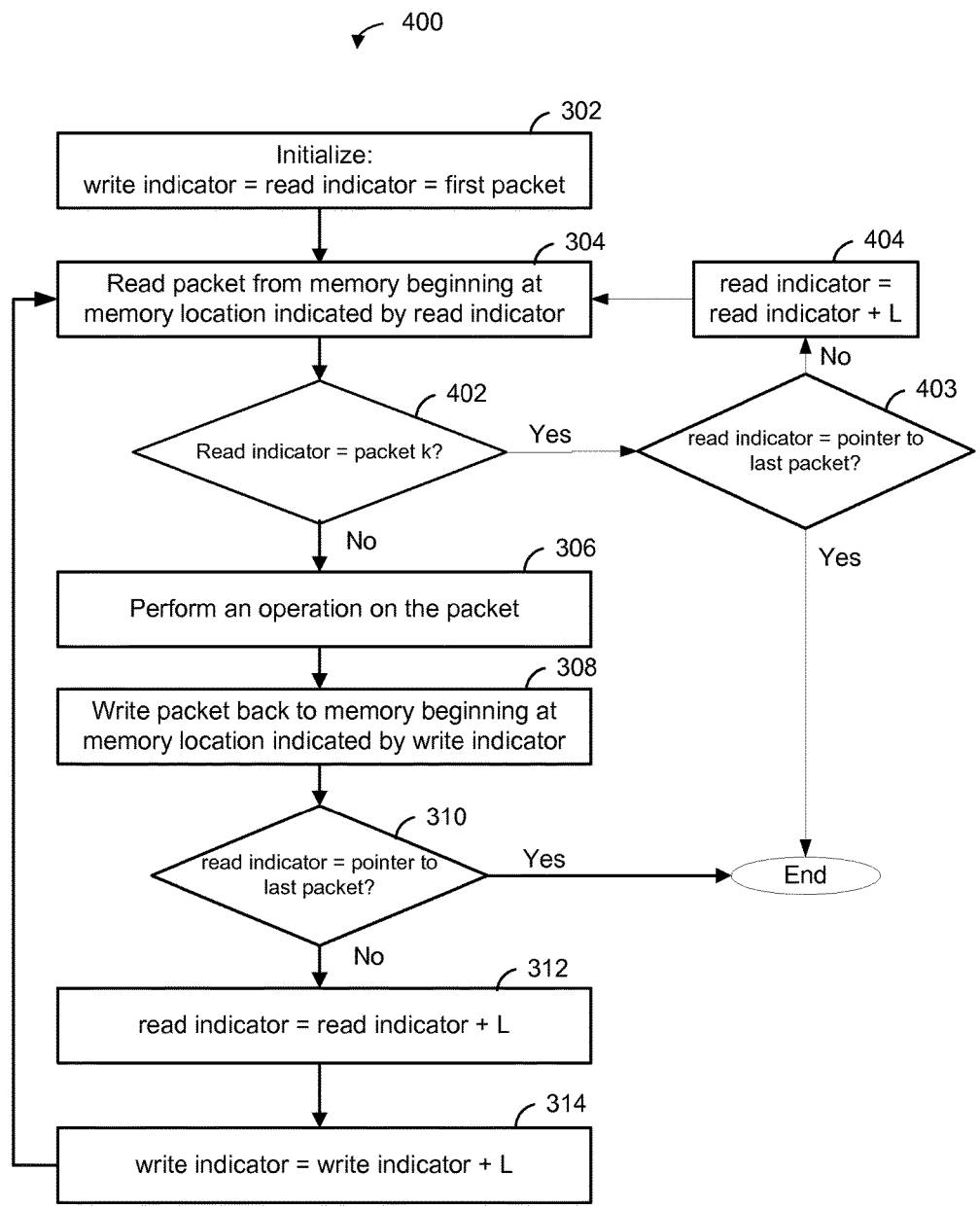
FIG. 4 is a flow diagram of a method for removing, or eliminating, a packet from a sequence of packets read from a memory, according to an embodiment.

FIG. 4 is a flow diagram of a method 400 for removing, or eliminating, a packet from a sequence of packets read from a memory, according to an embodiment. In an embodiment, the processor 102 implements the method 400 to remove a packet 204 from the packet sequence 202 stored in the memory 200. In other embodiments, the processor 102 implements a method different from method 400 to remove a packet from a sequence of packets stored in a memory. Similarly, the method 400 is implemented by a device other than the processor 102 and/or by a network device other than the network device 100, in some embodiments. Merely for explanatory purposes, the method 400 will be described with reference to FIGS. 1 and 2.

The method 400 is similar to the method 300 of FIG. 3 and includes several like-numbered blocks with the method 300 of FIG. 3. In an embodiment, the processor 102 implements the method 400 when a packet k is to be removed from the packet sequence 202, in an embodiment. In an embodiment, each time the processor 102 reads a packet 204 from the memory 200 at block 304, the processor 102 checks, at block 402, whether the packet 204 corresponds to the packet k that is to be removed from the sequence 202. For example, in an embodiment, the processor 102 utilizes the read indicator 114 set to read the packet 204 at block 304 to an indicator of a memory location of the packet k to be removed from the packet sequence 202, in an embodiment. If it is determined at block 402 that the packet 204 read from the memory 200 at block 304 corresponds to the packet k to be removed from the packet sequence 202, then the method 400 continues at block 403 at which the processor 102 checks whether the read indicator 114 currently points to the last packet 204 in the sequence 202 to be read from the memory 200. If it is determined that the read indicator 114 points to the last packet 204 in the sequence 202 to be read from the memory 200, this indicates that the packet k was the last packet in the packet sequence 202. In this case, the method 400 terminates, in an embodiment. Accordingly, in this case, the method 400 terminates without performing on operation on the packet k (e.g., without sending the packet k to the egress interface 110) at block 306, in an embodiment. In an embodiment, terminating the method 400 includes returning to block 302 and again initiating the method 400.

On the other hand, if it is determined at block 403 that the read indicator 114 does not currently point to the last packet 204 in the sequence 202 to be read from the memory 200, this indicates that the packet k is not the last packet in the sequence of packets to be read from the memory 200, in an embodiment. In this case, the method 400 proceeds to block 404 at which the read indicator 114 is incremented by the length L of the packet k to be removed from the packet sequence 202. Then, the method 400 returns to block 304 at which the next packet 204 is read from the memory 200 using the read indicator 114 incremented at block 406. Subsequently, when the next packet 204 (i.e., packet k+1) in the packet sequence 202 is written to the memory 200 using the write indicator 116 at block 308, the packet k+1 (or the packet k+1 preceded by a length indicator corresponding to the packet k+1) is "written over" the packet k in the memory 200, in an embodiment. Further, after the packet k+1 is written to the memory 200 at block 304, and the write indicator 116 is incremented by the length of the packet k+1 (or by a suitable number greater than the length of the packet k+1), the packet k+2 that follows the packet k+1 is written to the memory 200 at a predetermined distance (e.g., zero distance if the write indicator 116 is incremented by the length of the packet k+1) from the packet k+1 in the memory 200, in an embodiment. Similarly, the packet k+2 is written to the memory 200 at a predetermined distance from the packet k+1, and so on, in an embodiment. Accordingly, after the packet k is removed from the packet sequence 202, the remaining packets 204 in the packet sequence 202 are written to the memory 202 at predetermined distances (e.g., zero distance) from previous packets 204 in the packet sequence 202, in this embodiment.

Figure 5:
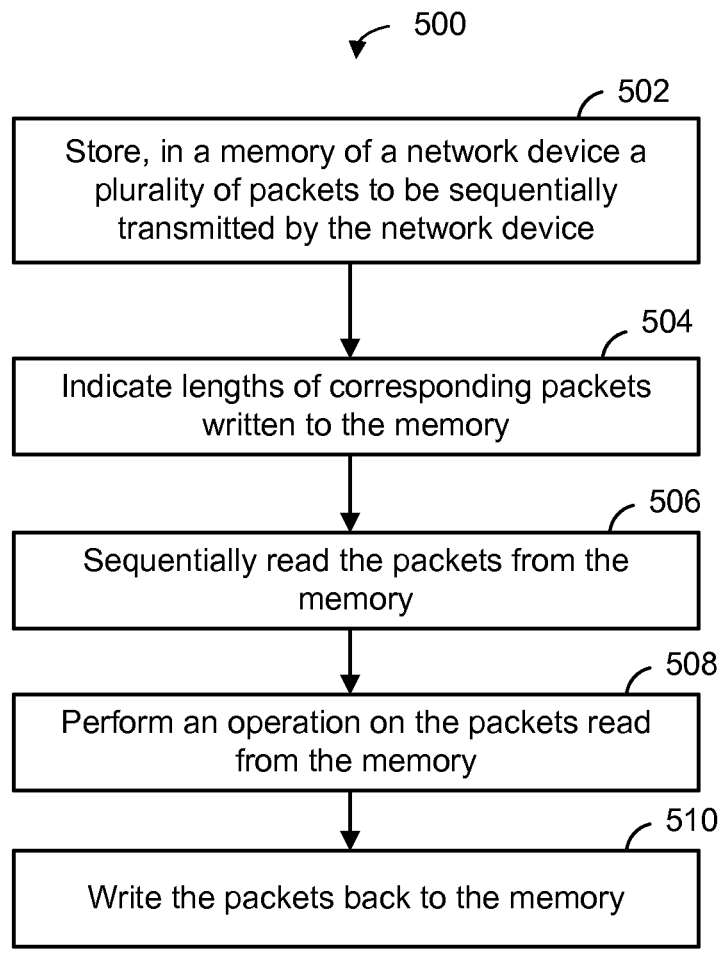
FIG. 5 is a flow diagram of an example method for storing a sequence of packets to be transmitted by a network device, according to an embodiment.

FIG. 5 is a flow diagram of an example method 500 for storing a sequence of packets to be transmitted by a network device, according to an embodiment. The method 500 is implemented by the network device 100 of FIG. 1, in an embodiment. In other embodiments, the method 500 is implemented by another suitable network device.

At block 502, a sequence of packets is stored in a memory of a network device. In an embodiment, the sequence of packets is stored in the memory of the network device such that a current packet in the sequence is stored at a predetermined memory location following a preceding packet in the sequence. In an embodiment, the predetermined distance at which the current packet is the sequence is stored from the preceding packet in the sequence is zero for each packet in the sequence. In another embodiment, the predetermined distance at which the current packet is the sequence is stored from the preceding packet in the sequence is a suitable distance other than zero for ones of at least some of the packets in the sequence.

At block 504, lengths of the packets in the sequence are indicated in the memory of the network device. In an embodiment, an indicator of a respective length corresponding to a packet in the sequence is written to the memory at a memory location immediately preceding the corresponding packet in the memory. In another embodiment, respective lengths indicators are written to other suitable memory locations in the memory of the network device, or are stored in a different memory of the network device.

At block 506, the sequence of packets is sequentially read from the memory. In an embodiment, the packets are sequentially read from the memory at block 506 using the lengths of the corresponding packets indicated at block 504. At block 508, an operation is performed on ones of packets read from the memory. At block 510, the sequence of packets is written back to the memory. In an embodiment, the packets are written back to the memory at block 510 such that ones of packets being written to the memory beginning at a memory location, of the plurality of memory locations, following a respective preceding packet in the sequence by a predetermined distance.

In an embodiment, performing operations on the packet at block 508 includes altering the sequence, for example altering a length of one or more packets in the sequence, eliminating one or more packets from the sequence, inserting one or more new packets into the sequence, etc. In such embodiments, writing the sequence of packets back to the memory at block 510 comprises writing the altered sequence back to the memory at block 510. Accordingly, the method 500 allows for altering of the sequence while maintaining a predetermined distance (or respective predetermined distances) between the packets as the packets of the altered sequence are written back to the memory at block 510, in an embodiment.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for storing a sequence of packets to be transmitted by a network device, the method comprising:
    storing the sequence of packets in a memory of the network device, wherein the memory includes a plurality of memory locations, and wherein storing the sequence of packets includes storing the packets, in the sequence of packets, such that a current packet in the sequence of packets is stored at a predetermined distance following a preceding packet in the sequence;
    indicating, in the memory of the network device, lengths of corresponding ones of the packets stored in the memory;
    maintaining a read indicator to indicate a memory location from which to read a next packet in the sequence;
    based on the indicated lengths of corresponding ones of the packets stored in the memory, sequentially reading the packets from the memory;
    maintaining a write indicator to indicate a memory location to which a next packet in the sequence is to be written;
    performing one or more operations on the ones of the packets read from the memory, including i) sequentially transmitting at least some of the packets read from the memory including a first packet, and ii) modifying the first packet to generate a modified first packet, wherein modifying the first packet results in reducing a length of the first packet resulting in a new length; and
    subsequent to performing the one or more operations, writing at least some of the packets back to the memory, ones of the packets being written to the memory beginning at a memory location, of the plurality of memory locations, following a respective preceding packet in the sequence by a predetermined distance, including: i) writing a length indicator indicative of the new length of the first packet to a memory location corresponding to the memory location indicated by the write indicator, ii) writing the modified first packet that was transmitted back to the memory at a second memory location that follows a preceding second packet in the sequence by the predetermined distance and that immediately follows the first memory location, and iii) incrementing the write indicator by a value corresponding to the new length of the first packet.

2. The method of claim 1, wherein storing the sequence of packets such that the current packet in the sequence of packets is stored at the predetermined distance following the preceding packet in the sequence comprises storing the sequence without any blank space between the packets in the sequence.

3. The method of claim 1, wherein a third packet is followed by a fourth packet in the sequence, wherein performing one or more operations on the ones of the packets read from the memory comprises eliminating the third packet from the sequence, and wherein the method further comprises:
    after reading the fourth packet from the memory, writing the fourth packet to the memory at a memory location indicated by the write indicator without incrementing the write indicator by a length indicated for the third packet.

4. The method of claim 1, further comprising:
    maintaining an initial packet indicator to indicate a first memory location, of the plurality of memory locations, corresponding to an initial packet in the sequence,
    maintaining a last packet indicator to indicate a memory location, of the plurality of memory locations, corresponding to a last packet in the sequence, and
    wherein sequentially reading the sequence of packets from the memory includes sequentially reading memory locations in the memory beginning with the first memory location corresponding to the initial packet until reaching an end of the last packet.

5. The method of claim 4, further comprising inserting an additional packet into the sequence, including:
    writing the additional packet beginning at a memory location at a predetermined distance following the last packet in the sequence, and
    updating the last packet indicator to indicate the memory location of the additional packet.

6. A system, comprising:
    an egress interface configured to transmit a sequence of packets;
    a memory comprising a plurality of memory locations, the memory configured to store the sequence of packets such that a current packet in the sequence of packets is stored in the memory at a predetermined distance following a preceding packet in the sequence; and
    a processor configured to
        indicate, in the memory, lengths of corresponding ones of the packets stored in the memory;
        maintain a read indicator to indicate a memory location from which to read a next packet in the sequence;
        based on the indicated lengths of corresponding ones of the packets stored in the memory, sequentially read the packets from the memory;
        maintain a write indicator to indicate a memory location to which a next packet in the sequence is to be written;
        perform one or more operations on the ones of the packets read from the memory, including i) sequentially sending at least some of the packets read from the memory, including a first packet, to the egress interface to be sequentially transmitted via the egress interface, and ii) modifying the first packet to generate a modified first packet, wherein modifying the first packet results in reducing a length of the first packet resulting in a new length; and
        subsequent to performing the one or more operations, write at least some of the packets back to the memory, ones of the packets being written to the memory beginning at a memory location, of the plurality of memory locations, following a respective preceding packet in the sequence by a predetermined distance, including: i) writing a length indicator indicative of the new length of the first packet to a memory location corresponding to the memory location indicated by the write indicator, ii) writing the modified first packet that was transmitted back to the memory at least partially in place of the first packet read from the memory and at a second memory location that immediately follows the first memory location and that follows a preceding second packet in the sequence by the predetermined distance, and iii) incrementing the write indicator by a value corresponding to the new length of the first packet.

7. The system of claim 6, wherein the memory is configured to store the sequence of packets without any blank space between the packets in the sequence.

8. The system of claim 6, wherein:
a third packet is followed by a fourth packet in the sequence; and
the processor is configured to:
eliminate the third packet from the sequence, and
after reading the fourth packet from the memory, write the fourth packet to the memory at a memory location indicated by the write indicator without incrementing the write indicator by a length indicated for the third packet.

9. The system of claim 6, wherein the processor is further configured to:
maintain an initial packet indicator to indicate a first memory location, of the plurality of memory locations, corresponding to an initial packet in the sequence,
maintain a last packet indicator to indicate a memory location, of the plurality of memory locations, corresponding to a last packet in the sequence, and
sequentially read the sequence of packets from the memory at least by sequentially reading memory locations in the memory beginning with the first memory location corresponding to the initial packet until reaching an end of the last packet.

10. The system of claim 9, wherein the processor is further configured to insert an additional packet into the sequence, at least by:
writing the additional packet beginning at a memory location at a predetermined distance following the last packet in the sequence, and
updating the last packet indicator to indicate the memory location of the additional packet.

11. A method for storing a sequence of packets to be transmitted by a network device, the method comprising:
storing the sequence of packets in a memory of the network device, wherein the memory includes a plurality of memory locations, and wherein storing the sequence of packets includes storing the packets, in the sequence of packets, such that a current packet in the sequence of packets is stored at a predetermined distance following a preceding packet in the sequence;
indicating, in the memory of the network device, lengths of corresponding ones of the packets stored in the memory;
maintaining a read indicator to indicate a memory location from which to read a next packet in the sequence;
based on the indicated lengths of corresponding ones of the packets stored in the memory, sequentially reading the packets from the memory;
maintaining a write indicator to indicate a memory location to which a next packet in the sequence is to be written;
performing one or more operations on the ones of the packets read from the memory, including i) sequentially transmitting at least some of the packets read from the memory including a first packet, and ii) modifying the first packet to generate a modified first packet, wherein modifying the first packet results in increasing a length of the first packet resulting in a new length;
storing at least a portion of the modified first packet in a cache; and
subsequent to performing the one or more operations, writing at least some of the packets back to the memory, ones of the packets being written to the memory beginning at a memory location, of the plurality of memory locations, following a respective preceding packet in the sequence by a predetermined distance, including: i) writing a length indicator indicative of a new length of the first packet to a memory location corresponding to the memory location indicated by the write indicator, ii) after reading a next packet from the memory, transferring, to the memory, the at least the portion of the modified first packet stored in the cache such that the modified first packet is stored in the memory beginning at a second memory location that immediately follows the first memory location, and iii) incrementing the write indicator by a value corresponding to the new length of the first packet.

12. A system, comprising:
an egress interface configured to transmit a sequence of packets;
a memory comprising a plurality of memory locations, the memory configured to store the sequence of packets such that a current packet in the sequence of packets is stored in the memory at a predetermined distance following a preceding packet in the sequence; and
a processor configured to
indicate, in the memory, lengths of corresponding ones of the packets stored in the memory;
maintain a read indicator to indicate a memory location from which to read a next packet in the sequence;
based on the indicated lengths of corresponding ones of the packets stored in the memory, sequentially read the packets from the memory;
maintain a write indicator to indicate a memory location to which a next packet in the sequence is to be written;
perform one or more operations on the ones of the packets read from the memory, including i) sequentially sending at least some of the packets read from the memory, including a first packet, to the egress interface to be sequentially transmitted via the egress interface, and ii) modifying the first packet to generate a modified first packet, wherein modifying the first packet results in increasing a length of the first packet resulting in a new length;
store at least a portion of the modified first packet in a cache; and
subsequent to performing the one or more operations, write at least some of the packets back to the memory, ones of the packets being written to the memory beginning at a memory location, of the plurality of memory locations, following a respective preceding packet in the sequence by a predetermined distance, including: i) writing a length indicator indicative of the new length of the first packet to a memory location corresponding to the memory location indicated by the write indicator, ii) writing the modified first packet that was transmitted back to the memory at least partially in place of the first packet read from the memory and at a second memory location that immediately follows the first memory location, including after reading a next packet from the memory, transferring, to the memory, the at least the portion of the modified first packet stored in the cache such that the modified first packet is stored in the memory beginning at the second memory location, and iii) incrementing the write indicator by a value corresponding to the new length of the first packet.

* * * * *